United States Patent Office 2,756,229
Patented July 24, 1956

2,756,229

XANTHINE DERIVATIVES

Willy Stoll, Basel, and Erich Schmid, Riehen, near Basel, Switzerland, assignors to J. R. Geigy A. G., Basel, Switzerland, a Swiss firm No Drawing. Application October 30, 1953, Serial No. 389,454

Claims priority, application Switzerland November 7, 1952

5 Claims. (Cl. 260—256)

German Patent No. 191,106 proposes the conversion of xanthines which are usable as diuretics, such as theophyllin, methyl xanthine and theobromine, into their N-hydroxyalkyl derivatives such as e. g. 7-hydroxyethyl-theophyllin. Due to its good solubility and non-irritability, this latter compound is also very suitable for injection. According to newer pharmacological and clinical trials, its diuretic action is not actually superior to that of the basic theophyllin but with regard to tolerance, it appears to be considerably superior to theophyllin.

It has now been found that the 1.3-dialkyl-7-hydroxy-alkyl-xanthines of the general formula

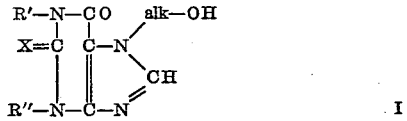

wherein X represents oxygen or sulphur, alk-OH represents a hydroxyalkyl radical with 2–4 carbon atoms and R' and R" represents the same or different lower alkyl or alkenyl radicals having together at least 3 carbon atoms, have an essentially stronger diuretic action in comparison with theophyllin and 7-hydroxyethyl-theophyllin and at the same time are also well tolerated.

The new compounds can be produced by reacting 1.3-dialkyl-xanthines or thioxanthines of the general formula

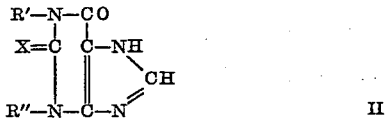

wherein X, R' and R" have the meanings given above, with alkane diols with 2–4 carbon atoms or reactive derivatives thereof such as halogen hydrins or inner ethers (alkylene oxides). If necessary the 1.3-dialkyl-xanthines can be reacted with the addition of dehydrating agents or acid binding agents or they can be reacted in the form of their salts. In the following, mention is only made of xanthines, but the information given is also true of thioxanthines.

When reacting with halogen hydrins it is of advantage to use the 1.3-dialkyl-xanthines in the form of their alkali salts which dissolve well in water. The 1.3-dialkyl-xanthines can be dissolved, e. g. directly in diluted caustic soda lye, the halogen hydrin added and the reaction solution can then be heated in the autoclave. Methanol or ethanol for example can be added to reduce the liquid volume of the caustic soda lye when using relatively higher 1.3-dialkyl-xanthines or halogen hydrins which cannot be mixed with water.

The free 1.3-dialkyl-xanthines are used for the reaction with alkylene oxides and also with the alkane diols. The reactions can take place in inert organic solvents.

A particular method of performing the above mentioned process consists in using for the reaction with 1.3-dialkyl xanthines, the esters of halogen hydrins which can be easily split instead of the free halogen hydrins themselves, such as e. g. acetic acid esters and then hydrolysing the 1.3-dialkyl-7-acyloxyalkyl xanthines thus obtained to form the corresponding 1.3-dialkyl-7-hydroxyalkyl xanthines, e. g. by the use of the calculated amount of lye in aqueous or alcoholic solution.

1 - methyl - 3 - ethyl - xanthine, 1 - ethyl - 3 - methyl-xanthine, 1.3 - diethyl - xanthine, 1 - methyl - 3 - n - propyl - xanthine, 1 - ethyl - 3 - n - propyl - xanthine, 1 - ethyl-3 - isopropyl - xanthine, 1 - 3 - di - n - propyl - xanthine, 1 - methyl - 3 - n - butyl - xanthine, 1 - ethyl - 3 - n - butyl-xanthine, 1.3 - di - n - butyl - xanthine, 1.3 - di - isobutyl-xanthine, 1 - ethyl - 3 - allyl - xanthine, 1 - allyl - 3 - ethyl-xanthine, 1.3 - diallyl - xanthine, 1 - methyl - 3 - ethyl - 2-thioxanthine, 1.3 - diethyl - 2 - thioxanthine and 1.3 - di-n - propyl - 2 - thioxanthine can be named as 1.3 - dialkyl-xanthines of the general formula given above.

Ethylene chlorohydrin and -bromohydrin, 2 - chloro - 1-propanol, 1 - chloro - 2 - propanol, 3 - chloro - 1 - propanol, 1 - chloro - 2 - butanol, 3 - chloro - 2 - butanol, 4-chloro - 2 - butanol, 4 - chloro - 1 - butanol, 4 - bromo-1 - butanol and 1 - chloro - 2 - methyl - 2 - propanol (chloro-tert. butanol) can be named as halogen hydrins of alkane diols for example. Ethylene oxide and propylene oxide can be named as alkylene oxides and β-chloropropyl acetate, γ-chloropropyl acetate and δ-bromobutyl acetate can be named as esters of halogen hydrins.

Instead of replacing the hydrogen atom in the 7-position directly by a hydroxyalkyl radical, a radical can be introduced into this position which contains a group which can be reduced to the hydroxy group and then converting this group into the hydroxy group. Such groups which can be thus reduced are the keto group, the aldehyde group, which it is advantageous to introduce in the form of an acetal which will afterwards be hydrolysed, and the carboxylic acid ester group.

A further process for the production of the new compounds consists accordingly in treating a 1.3-dialkyl-7-oxoalkyl-xanthine of the general formula:

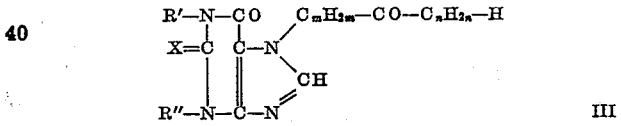

wherein m represents a number from 1–3, and n represents a number of 0–2, but m and n together may not be more than 3, and wherein X, R' and R" have the meanings given above, with reducing agents.

In a further process, which is related to the above, the new compounds are produced by treating an ester of a 1.3-dialkyl-7-carboxyalkyl-xanthine having the general formula:

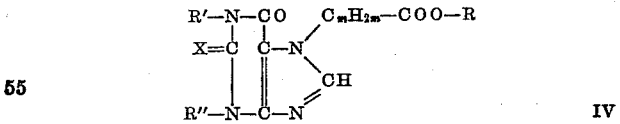

wherein R represents a hydrocarbon radical and X, R' and R" and m have the meanings given above, with reducing agents.

Both the reductions of the 1.3-dialkyl-7-oxoalkyl-xanthines of the general Formula III and also of the esters of 1.3-dialkyl-7-carboxyalkyl-xanthines can be performed with satisfactory to good yields by means of lithium aluminium hydride, e. g. in ether.

The derivatives of the previously named 1.3-dialkyl-xanthines substituted in the 7-position by a β-oxoethyl-(formylmethyl), β-oxopropyl-(acetonyl), γ-oxopropyl-, β-oxobutyl, α-methyl-β-oxopropyl-, γ-oxobutyl-, carbethoxymethyl, α-carbethoxy-ethyl-, β-carbethoxy-ethyl-, α-carbomethoxy-propyl- or γ-carbethoxy-propyl group can be used, e. g. as starting materials for the two processes described above. They can be easily produced for example by reacting with alkali compounds of the 1.3-dialkyl-xanthines named with acetals of the corresponding halogen aldehydes and then hydrolysing, or with corresponding halogen ketones or with corresponding halogen fatty acid esters respectively.

Finally it is also possible to convert derivatives of 7-hydroxyalkyl-thioxanthine of the general formula:

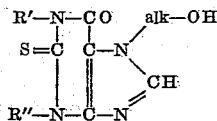

wherein alk-OH, R' and R'' have the meanings given above, into the corresponding 7-hydroxyalkyl-xanthine derivatives by treating them with the usual desulphurising agents, e. g. by heating with heavy metal oxides such as mercuric oxide or lead oxide.

The new 1.3-dialkyl-7-hydroxyalkyl-xanthine or -2-thioxanthine derivatives are, to a great extent, crystallised substances which dissolve in water to about 1%. The water solubility decreases the greater the alkyl radicals are in the 1- and 3-positions.

The following examples serve to illustrate the production of the new compounds. Where not otherwise stated, parts are given as parts by weight and the relationship of parts by weight to parts by volume is as that of grammes to cubic centimetres. The temperatures are given in degrees centigrade.

Example 1

41.6 parts of 1.3-diethyl-xanthine are dissolved while heating in 200 parts by volume of N-caustic soda lye, 17 parts of ethylene chlorohydrin and 180 parts by volume of water are then added and the whole is heated at 130–140° for 5 hours in the autoclave while stirring. After cooling, the reaction solution is purified by filtration and then made neutral by the addition of sodium carbonate. The volume is then reduced to about a third in the vacuum, after which it is cooled. The main part of the reaction product precipitates. After filtering the volume can be still further reduced whereupon a further small amount precipitates. On recrystallising from ethanol, the 1.3-diethyl-7-($\beta$-hydroxy-ethyl)-xanthine melts at 131–133°.

Example 2

19.4 parts of 1-methyl-3-ethyl-xanthine are dissolved in 100 parts by volume of N-caustic soda lye, 14 parts of ethylene chlorohydrin are added and the whole is heated for 5 hours at 120–130° in the autoclave. The reaction solution which is so obtained is purified by filtration, made neutral with sodium carbonate and then filtered again if necessary. The filtrate is evaporated to dryness in the vacuum, the residue in 150 parts by volume of abs. ethanol with the addition of animal charcoal is boiled and filtered hot. On cooling, the 1-methyl-3-ethyl-7-($\beta$-hydroxy-ethyl)-xanthine precipitates. Melting Point 127.5–130°.

Example 3

22.2 parts of 1-ethyl-3-n-propyl-xanthine are dissolved in 100 parts by volume of N-caustic soda lye and heated with 12 parts of ethylene chlorohydrin and 50 parts by volume of water for 5 hours at 130–140° in the autoclave. After working up (as described in Example 1), 1-ethyl-3-n-propyl-7-($\beta$-hydroxy-ethyl)-xanthine is obtained. M. P. 120.5–122°.

Example 4

26.4 parts of 1.3-di-n-butyl-xanthine are dissolved while heating in 100 parts by volume of N-caustic soda lye and 20 parts by volume of ethanol. 8.5 parts of ethylene chlorohydrin and 100 parts by volume of water are added and the whole is heated for 5 hours at 130–140° in the autoclave. The product is worked up as described in Example 2; acetone is used for the recrystallisation. 1.3-di-n-butyl-7-($\beta$-hydroxy-ethyl)-xanthine is obtained in the form of white crystals. M. P. 89–91°.

Example 5

20.8 parts of 1.3-diethyl-xanthine are suspended in 80 parts by volume of water and 5 parts of ethylene oxide are added. The whole is heated in the autoclave for 4 hours at 130–140° whereupon the same product as described in Example 1 is obtained by processing as described in that example.

Example 6

20.8 parts of 1.3-diethyl-xanthine and 7 parts of propylene oxide and 40 parts by volume of water are heated for 3 hours in the autoclave at 130–140°. The water is then evaporated in the vacuum, the residue is ground with 2-N-caustic soda lye in order to extract any unchanged starting substance, the product is filtered under suction, washed with water until it has a neutral reaction and recrystallised from ethyl acetate. 1.3-diethyl-7-($\beta$-hydroxy-propyl)-xanthine is obtained in a good yield. M. P. 132–134.5°.

Example 7

25.8 parts of the sodium salt of 1.3-di-n-propyl-xanthine and 19.5 parts of $\delta$-bromobutyl acetate in 100 parts by volume of tetrahydronaphthalene are boiled under reflux for 2 hours. The whole is then filtered and the solvent evaporated off in the vacuum. The residue, in a sodium alcoholate solution made up from 100 parts by volume of ethyl alcohol and 2.3 parts of sodium, is boiled under reflux for 1 hour and then neutralised with 2 N-hydrochloric acid. The alcohol is then distilled off in the vacuum, the inorganic salts are removed from the residue and the latter is distilled in the vacuum. 1.3-di-n-propyl-7-($\delta$-hydroxy-butyl)-xanthine passes over at 202–205° under 0.3 mm. pressure and at 193–195° under 0.15 mm. pressure. It is a pale yellow oil which gradually solidifies.

If the sodium salt of 1.3-diethyl-xanthine is used instead of that of 1.3-di-n-propyl-xanthine, 1.3-diethyl-7-($\delta$-hydroxy-butyl)-xanthine is obtained in an analogous manner. It boils at 195–198° under 0.35 mm. pressure and forms a hydrate which melts at 74°.

The following compounds for example can be produced according to the processes described in the above examples:

1. 1-ethyl-3-isopropyl-7-($\beta$-hydroxy-ethyl)-xanthine, M. P. 76–80°
2. 1.3-di-isobutyl-7-($\beta$-hydroxy-ethyl)-xanthine, M. P. 108.5–110.5°
3. 1-ethyl-3-allyl-7-($\beta$-hydroxy-ethyl)-xanthine, M. P. 113–116°
4. 1-allyl-3-ethyl-7-($\beta$-hydroxy-ethyl)-xanthine, M. P. 94–96.5°
5. 1.3-diallyl-7-($\beta$-hydroxy-ethyl)-xanthine, M. P. 122–124°
6. 1.3-di-n-propyl-7-($\beta$-hydroxy-propyl)-xanthine, M. P. 89.5–91°
7. 1.3-di-n-butyl-7-($\beta$-hydroxy-propyl)-xanthine, M. P. 67–71°
8. 1.3-diethyl-7-($\gamma$-hydroxy-propyl)-xanthine, M. P. 86.5–88.5°
9. 1.3-di-n-propyl-7-($\gamma$-hydroxy-propyl)-xanthine, M. P. 80–82°
10. 1.3-diethyl-7-($\beta$-hydroxy-isobutyl)-xanthine, M. P. 118.5–120°
11. 1.3-di-n-propyl-7-($\beta$-hydroxy-isobutyl)-xanthine, M. P. 107–109.5°
12. 1.3-diethyl-7-($\beta$-hydroxy-ethyl)-2-thioxanthine, M. P. 133.5–135°
13. 1.3-diethyl-7-($\beta$-hydroxy-propyl)-2-thioxanthine, M. P. 132–135°.

Example 8

29.4 parts of 1.3-diethyl-7-carbethoxymethyl xanthine (M. P. 113.5–115°) in 1800 parts by volume of abs. ether are boiled under reflux for 7 hours with 2.5 parts of lithium aluminium hydride, the ether is distilled off, the residue is stirred into ammonium chloride solution and then filtered under suction. The filter residue is extracted with hot alcohol and 1.3-diethyl-7-(β-hydroxyethyl)-xanthine is obtained by evaporating off the alcoholic solution.

Example 9

26.4 parts of 1.3-diethyl-7-acetonyl-xanthine (M. P. 133–135°; prepared from the sodium salt of 1.3-diethyl-xanthine and monochloroacetone, or from 1.3-diethyl-xanthine-7-acetic acid by boiling with acetanhydride and pyridine) in 800 parts by volume of abs. ether are boiled under reflux for 2½ hours with 6 parts of lithium aluminium hydride. After evaporating off the ether and working up as described in Example 8, 1.3-diethyl-7-(β-hydroxy-propyl)-xanthine is obtained.

Example 10

23.1 parts of the sodium salt of 1.3-diethyl-xanthine in 150 parts by volume of abs. xylene are boiled under reflux for 4 hours with 15 parts of chloracetal (chloracetaldehyde diethyl acetal). The hot solution is filtered under suction, the xylene is evaporated in the vacuum and the residue is ground with 2 N-caustic soda lye to remove unreacted 1.3-diethyl-xanthine. The raw acetal which has been filtered under suction and washed with water is suspended in diluted hydrochloric acid and heated on a water bath while stirring for 1 hour. The 1.3-diethyl-7-(α-oxo-ethyl)-xanthine formed is taken up in ether, the ether solution is well dried with freshly calcined magnesium sulphate and reduced with 2.5 parts of lithium aluminium hydride as described in Example 8. 1.3-diethyl-7-(β-hydroxy-ethyl)-xanthine which is described in Example 1, is obtained.

Example 11

2,68 parts of 1.3-diethyl-7-(β-hydroxy-ethyl)-2-thio-xanthine (M. P. 131–133°) in 120 parts by volume of tetrahydronaphthalene are heated for 3 hours under reflux with 11 parts of mercuric oxide (HgO, orange) in which process the colour of the mercuric oxide gradually becomes duller and finally dark. The whole is filtered off hot from the mercuric sulphide and oxide. 1.3-diethyl-7-(β-hydroxy-ethyl)-xanthine crystallises from the filtrate and, after recrystallisation from alcohol, melts at 131.5–133° C. The melting point of this product mixed with a sample produced according to Example 1 is not lower but with a mixture of this product with the starting material there is a considerably lower melting point.

The xanthine derivatives according to this invention may be associated with a solid pharmaceutical carrier to form pharmaceutical compositions. These may be in the form of capsules, powders, tablets or any other form which is suitable for administration per os. The compositions may be obtained by admixing the active ingredient, i. e. the xanthine derivatives with pharmaceutical carriers such as cornstarch, lactose, stearic acid, talc, magnesium stearate, etc.

What we claim is:

1. Xanthine derivatives corresponding to the general formula:

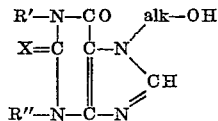

wherein X represents a member selected from the group consisting of oxygen and sulphur, one R represents a member selected from the group consisting of alkyl and alkenyl radicals with at most 4 carbon atoms, the other R represents a member selected from the group consisting of alkyl and alkenyl radicals with at least 2 and at most 4 carbon atoms, and alk-OH represents a hydroxyalkyl radical with at least 2 and at most 4 carbon atoms, the hydroxyl group of said radical being separated from the nitrogen atom by at least 2 carbon atoms.

2. A xanthine derivative corresponding to the formula:

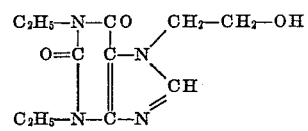

3. A xanthine derivative corresponding to the formula:

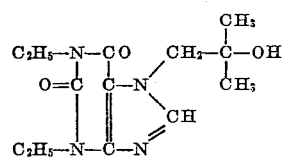

4. A xanthine derivative corresponding to the formula:

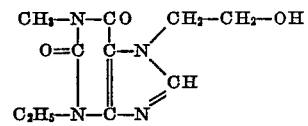

5. A xanthine derivative corresponding to the formula:

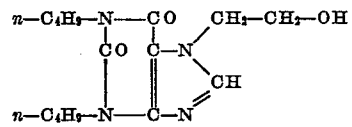

References Cited in the file of this patent

UNITED STATES PATENTS 2,351,843    Speer _____ June 20, 1944
2,517,410    Papesch _____ Aug. 1, 1950

OTHER REFERENCES

Hildebrandt: Deut. m. Wochschr., vol. 77, Jan. 4, 1952, pp. 13–15, through Squibb Abstract Bulletin, Feb. 27, 1952, p. A–243, "Theophylline (Beta-hydroxyethyl)- Pharmacology (diuretic action)."